United States Patent
Zhang et al.

(10) Patent No.: US 11,048,568 B2
(45) Date of Patent: Jun. 29, 2021

(54) BROADCAST SENDING CONTROL METHOD AND APPARATUS, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Jun Zhang, Dongguan (CN); Runsheng Pei, Dongguan (CN); Ruyu Wu, Dongguan (CN); Liangjing Fu, Dongguan (CN); Zhiyong Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 183 days.

(21) Appl. No.: 16/492,469

(22) PCT Filed: Oct. 19, 2017

(86) PCT No.: PCT/CN2017/106945
§ 371 (c)(1),
(2) Date: Sep. 9, 2019

(87) PCT Pub. No.: WO2018/161589
PCT Pub. Date: Sep. 13, 2018

(65) Prior Publication Data
US 2021/0141677 A1    May 13, 2021

(30) Foreign Application Priority Data
Mar. 10, 2017 (CN) .......................... 201710141463.3

(51) Int. Cl.
*G06F 9/54* (2006.01)
*G06F 9/50* (2006.01)

(52) U.S. Cl.
CPC ............ *G06F 9/546* (2013.01); *G06F 9/5083* (2013.01); *G06F 9/542* (2013.01); *G06F 2209/548* (2013.01)

(58) Field of Classification Search
CPC .......... G06F 9/4812; G06F 9/54; G06F 9/542; G06F 9/546
(Continued)

(56) References Cited

U.S. PATENT DOCUMENTS 7,406,537 B2 * 7/2008 Cullen .................. H04L 69/329
709/238
7,499,995 B2 * 3/2009 Armstrong ............ H04L 63/105
455/418

(Continued)

FOREIGN PATENT DOCUMENTS

| CN | 102855148 A | 1/2013 |
| CN | 103581966 A | 2/2014 |

(Continued)

OTHER PUBLICATIONS

Lars Vogel: "Android Broadcast Receiver—Tutorial Table of Contents", Jun. 27, 2016 (Jun. 27, 2016), p. 6, XP055644102.
(Continued)

*Primary Examiner* — Andy Ho (57) ABSTRACT

A broadcast sending control method includes: acquiring a receiver queue corresponding to a broadcast message; acquiring an application type and a launching state of a first receiver, wherein the first receiver is any receiver in the receiver queue; removing, in a case where the application type is a predetermined application type and the launching state is a predetermined launching state, the first receiver from the receiver queue; and sending, according to the receiver queue from which the first receiver has been removed, the broadcast message.

20 Claims, 4 Drawing Sheets

(58) Field of Classification Search
USPC .......................................... 719/313, 314, 318
See application file for complete search history.

(56) References Cited

U.S. PATENT DOCUMENTS

| | | | | |
|---|---|---|---|---|
| 8,935,330 B2* | 1/2015 | Jellard | ................... | G06Q 10/10 |
| | | | | 709/204 |
| 2003/0046395 A1 | 3/2003 | Fleming et al. | | |
| 2017/0070302 A1 | 3/2017 | Tuscano et al. | | |

FOREIGN PATENT DOCUMENTS

| | | |
|---|---|---|
| CN | 103595547 A | 2/2014 |
| CN | 104123162 A | 10/2014 |
| CN | 104156261 A | 11/2014 |
| CN | 104391743 A | 3/2015 |
| CN | 105094278 A | 11/2015 |
| CN | 105516487 A | 4/2016 |
| CN | 105528254 A | 4/2016 |
| CN | 105867983 A | 8/2016 |
| CN | 105975306 A | 9/2016 |
| CN | 106919460 A | 7/2017 |
| WO | 2016179237 A1 | 11/2016 |

OTHER PUBLICATIONS

Extended European Search Report for the EP patent application No. 17900242.3, dated Dec. 10, 2019.

* cited by examiner

BROADCAST SENDING CONTROL METHOD AND APPARATUS, STORAGE MEDIUM, AND ELECTRONIC DEVICE

CROSS-REFERENCE TO RELATED APPLICATIONS

The present disclosure is a national stage application of International Patent Application No. PCT/CN2017/106945, which is filed on Oct. 19, 2017 and claims priority to Chinese Patent Application No. 201710141463.3, filed to the China Patent Office on Mar. 10, 2017, entitled "Broadcast Sending Control Method and Apparatus, and Mobile Terminal", the contents of which are hereby incorporated by reference in its entirety.

The present application claims priority to Chinese Patent Application No. 201710141463.3, filed to the China Patent Office on Mar. 10, 2017, entitled "Broadcast Sending Control Method and Apparatus, and Mobile Terminal", the contents of which are hereby incorporated by reference in its entirety.

TECHNICAL FIELD

The embodiments of the present application relate to an electronic device application technology, and in particular, to a broadcast sending control method and apparatus, a storage medium, and an electronic device.

BACKGROUND

In an Android system, broadcasting is a mechanism widely used to transmit information between application programs. Since the broadcast mechanism is a message subscription/publishing mechanism, each application may subscribe to a broadcast message of interest before the broadcast message is sent. When the subscribed broadcast message is published by the system, the application that has subscribed to the broadcast will receive the broadcast message and make a response according to the received broadcast message.

However, with the development of technologies, applications with various functions have gradually increased, and more and more receivers subscribe to the same broadcast message. Since too many applications need to occupy a broadcast receiver queue for the reception of a broadcast, the response to the broadcast message is delayed, which affects the response time of the application program to the broadcast message.

SUMMARY

The embodiments of the present application relate to a broadcast sending control method and apparatus, a storage medium, and an electronic device, which can increase the response speed of an application program to a broadcast message.

According to a first aspect, the embodiments of the present application provide a broadcast sending control method, which may include that:

a receiver queue corresponding to a broadcast message is acquired;

an application type and a launching state of a first receiver are acquired, wherein the first receiver is any receiver in the receiver queue;

in a case where the application type is a predetermined application type and the launching state is a predetermined launching state, the first receiver is removed from the receiver queue; and the broadcast message is sent according to the receiver queue from which the first receiver has been removed.

According to a second aspect, the embodiments of the present application further provide a broadcast sending control apparatus, which may include:

a receiver queue acquiring module, configured to acquire a receiver queue corresponding to a broadcast message;

an application type and launching state acquiring module, configured to acquire an application type and a launching state of a first receiver, wherein the first receiver is any receiver in the receiver queue;

a receiver removing module, configured to remove, in a case where the application type is a predetermined application type and the launching state is a predetermined launching state, the first receiver from the receiver queue; and a broadcast message sending module, configured to send, according to the receiver queue from which the first receiver has been removed, the broadcast message.

According to a third aspect, the embodiments of the present application also provide a storage medium, having multiple instructions stored therein. The instructions may be adapted to be loaded by a processor to perform the above broadcast sending control method.

According to a fourth aspect, the embodiments of the present application further provide a mobile terminal, which may include: a memory, a processor and a computer program that is stored on the memory and runnable on the processor, wherein the computer program is executed by the processor to implement the following operations:

a receiver queue corresponding to a broadcast message is acquired;

an application type and a launching state of a first receiver are acquired, wherein the first receiver is any receiver in the receiver queue;

in a case where the application type is a predetermined application type and the launching state is a predetermined launching state, the first receiver is removed from the receiver queue; and the broadcast message is sent according to the receiver queue from which the first receiver has been removed.

DETAILED DESCRIPTION OF THE EMBODIMENTS

The present application will be further described in detail below with reference to the accompanying drawings and embodiments. It will be appreciated that the specific embodiments described herein are merely illustrative of the present application and are not intended to limit the present application. In addition, it is also to be noted that, for the convenience of description, only some but not all of the structures related to the present application are shown in the drawings.

It is to be mentioned before more detailed discussions about exemplary embodiments that some exemplary embodiments are described as processing or methods described in the flowcharts. Although each operation is described into sequential processing in the flowcharts, many operations therein may be implemented in parallel, concurrently or simultaneously. In addition, a sequence of each operation may be rearranged. When the operations are completed, processing may be terminated, but there may also be additional operations not included in the drawings. Processing may correspond to a method, a function, a procedure, a subroutine, a subprogram and the like.

The embodiments of the present application provide a broadcast sending control method, which includes the following operations:

a receiver queue corresponding to a broadcast message is acquired;

an application type and a launching state of a first receiver are acquired, wherein the first receiver is any receiver in the receiver queue;

in a case where the application type is a predetermined application type and the launching state is a predetermined launching state, the first receiver is removed from the receiver queue; and the broadcast message is sent according to the receiver queue from which the first receiver has been removed.

In some embodiments, removing the first receiver from the receiver queue in a case where the application type is the predetermined application type and the launching state is the predetermined launching state includes that:

in a case where an application type of a target application and the application type of the first receiver are both predetermined application types and the launching state is the predetermined launching state, it is judged whether the first receiver is an associated application of the target application, wherein the target application is a publisher of the broadcast message; and in response to the judgment that the first receiver is the associated application, the first receiver is retained in the receiver queue.

In some embodiments, judging whether the first receiver is the associated application of the target application includes that:

in a case where an application signature of the first receiver is the same as an application signature of the target application, it is determined that the first receiver is the associated application of the target application.

In some embodiments, judging whether the first receiver is the associated application of the target application includes that:

in a case where the first receiver has a data interaction relationship with the target application, it is determined that the first receiver is the associated application of the target application, wherein the data interaction relationship includes a service using relationship or a database using relationship.

In some embodiments, the predetermined application type is a third-party application, and the predetermined launching state is a non-launched state.

In some embodiments, sending the broadcast message according to the receiver queue from which the first receiver has been removed includes that:

a broadcast message blacklist is acquired;

receivers in the broadcast message blacklist are removed from the receiver queue from which the first receiver has been removed to obtain a receiver-removed queue; and the broadcast message is sent according to the receiver-removed queue.

In some embodiments, acquiring the receiver queue corresponding to the broadcast message includes that:

one or more application programs that subscribe to the broadcast message are acquired; and a corresponding receiver queue is generated according to the one or more acquired application programs.

Figure 1:
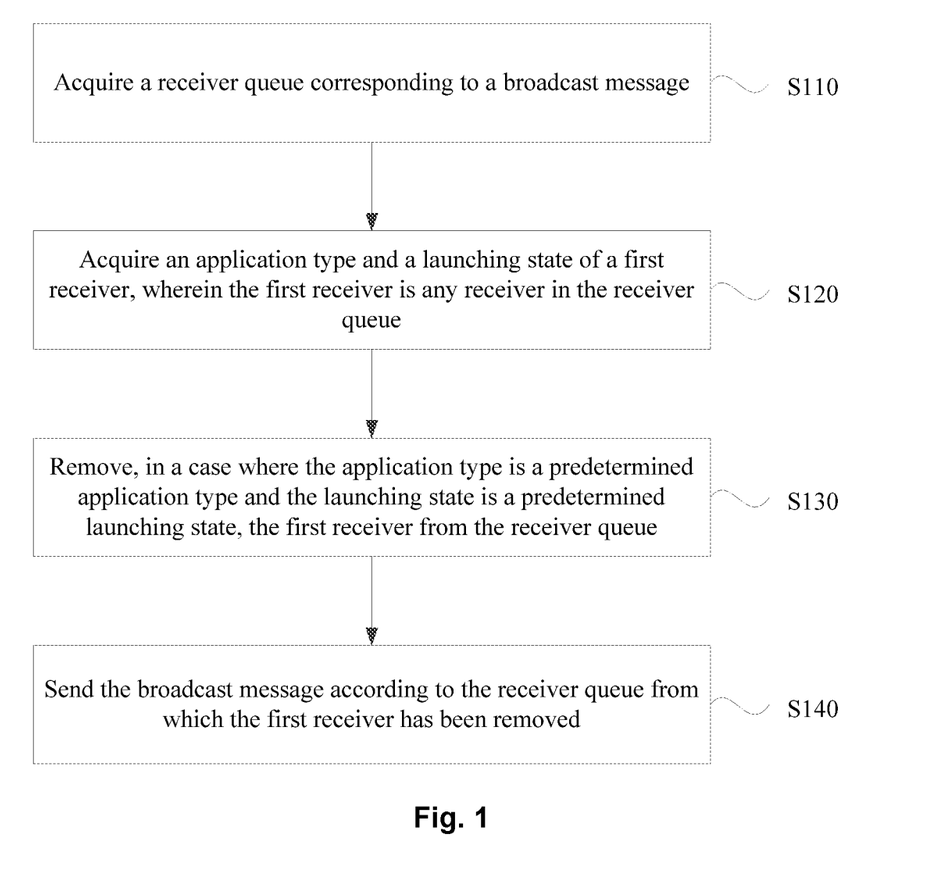
FIG. 1 is a flowchart of a broadcast sending control method according to an embodiment of the present application.

FIG. 1 is a flowchart of a broadcast sending control method according to an embodiment of the present application. The present embodiment may be applied to the case of broadcast sending. The method may be performed by a mobile terminal, where the mobile terminal may be a smart phone, a tablet computer, or the like. As shown in FIG. 1, a broadcast sending control method specifically includes the following operations:

S110: A receiver queue corresponding to a broadcast message is acquired.

The broadcast message includes a system broadcast message and a third-party broadcast message. The system broadcast message includes, for example, a time update broadcast message, a screen-on broadcast message, a screen-off broadcast message, a network switching broadcast message, and the like. The third-party broadcast message is a broadcast message published by a third-party application program. If an application program enters a certain interface, a broadcast message will be published to a broadcast management module to implement information exchange or other functions between the application program and other application programs under this interface.

A broadcast mechanism is a message subscription/publishing mechanism that subscribes to broadcasts of interest before the broadcast message is published by a system application program or a third-party application program. For example, for the network switching broadcast message, there may be 50 application programs that subscribe to it. When the system publishes the network switching broadcast message, the system may first publish the broadcast message to the broadcast management module, and the broadcast management module may obtain an application program subscribing to the broadcast message according to the broadcast message. In this way, the network switching broadcast message published by the system may be sent, the application program that subscribes to the broadcast message is used as a receiver, and the receiver may receive the broadcast message in the form of a queue.

There are several ways to obtain the receiver queue. Optionally, the application program subscribes to the broadcast message in the broadcast management module. Optionally, a user selection interface may be provided, and a broadcast message receiving list selected by a user is based, where the list may include receivers allowed to receive broadcast messages. For example, a system broadcast launching list may be set, where receivers in the list may be self-launched after receiving a system broadcast. With this arrangement, it is possible to prevent the application program that does not need to be used by the user from being self-launched after receiving any or the subscribed system broadcast, and from occupying memory resources and consuming energy. Optionally, a broadcast message blacklist may also be set, and receivers in the broadcast message blacklist are removed from the receiver queue.

The acquisition of the receiver queue and the above adjustment may be performed when the broadcast message is sent. Optionally, the acquisition of the receiver queue and the above adjustment may be performed when the broadcast message is generated and when the broadcast messages are queued.

S120: An application type and a launching state of a first receiver are acquired, wherein the first receiver is any receiver in the receiver queue.

The first receiver may be any receiver in the receiver queue. The application type of the first receiver may be divided depending on belonging to a system application and a third-party application, or may be divided according to functions, such as games, education, tourism, music, social, and news, or may also be divided according to other types. The launching state of the first receiver may include two categories: an launched state and a non-launched state, where the launched state may include a foreground running state, a background running state and an attached launching state, for example, an input method, which does not need to be separately launched, and may be attached to other application programs for launching to implement input functions.

S130: In a case where the application type is a predetermined application type and the launching state is a predetermined launching state, the first receiver is removed from the receiver queue.

The predetermined application type may be one or more of the foregoing multiple classification manners, and the predetermined launching state may be one or more of the foregoing launching states. The setting method may be set before the terminal is shipped from the factory, or may be customized according to the operating habits of users.

Exemplarily, if the first receiver is a third-party application when a system broadcast message is sent and the third-party application is not launched, the first receiver is removed from the receiver queue.

After obtaining an application type and launching state of the first receiver, it is judged whether the application type and the launching state are consistent with the predetermined application type and launching state, and if the application type and the launching state are consistent with the predetermined application type and launching state, the first receiver is removed from the receiver queue.

Exemplarily, when a broadcast message a and a receiver queue A, B, C, D, E, F, and G subscribing to the broadcast message a are acquired, the receiver A is a first receiver; if an application type of the receiver A is a third-party application, an launching state is LAUNCHED, a predetermined application type is a third-party application, a predetermined launching state is NON-LAUNCHED, then it is determined that the application type of the receiver A is consistent with the predetermined application type and the launching state is not consistent with the predetermined launching state, so that the application type and launching state of the receiver A match predetermined conditions. Other receivers in the receiver queue are continuously judged. If it is determined that the application type and launching state of the receivers B and E match the predetermined conditions, the receivers B and E are removed from the receiver queue. The receiver queue having the receiver B and the receiver E removed therefrom is A, C, D, F, and G.

S140: The broadcast message is sent according to the receiver queue from which the first receiver has been removed.

After the receiver queue is determined, a broadcast message may be sent to the receiver queue. The broadcast message may be published by a publisher to the broadcast management module, and the broadcast management module sends the broadcast message according to the determined receiver queue.

In the present embodiment, an application type and launching state of a receiver in a broadcast message receiver queue are acquired, and the receiver is removed from the receiver queue if it is determined that the application type and launching state of the receiver match predetermined conditions. The problem in the conventional art of influence on the response time of an application program to a broadcast message caused by the delay response to the broadcast message due to too many applications need to occupy the broadcast receiver queue for broadcast receiving is solved, and the response speed of the application program to the broadcast message can be increased.

On the basis of the above technical solution, optionally, the predetermined application type is a third-party application, and the predetermined launching state is a non-launched state.

During the determination of the launching state of the application program of the first receiver, a running task list may be acquired from an action manager, and an application program and service that are being run by the system currently may be obtained from the running task list. The manner of judging whether an application type of the application program is a third-party application may be implemented by the following codes:

```
Acquiring all applications:
    PackageManager packageManager = getPackageManager( );
    Intent mIntent = new Intent(Intent.ACTION_MAIN, null);
    mIntent.addCategory(Intent.CATEGORY_LAUNCHER);
    List<ResolveInfo> listAllApps = packageManager.queryIntentActivities(mIntent,
0); judge whether a current application is a system application:
    ResolveInfo appInfo = listAllApps.get(position);
    String pkgName = appInfo.activityInfo.packageName;// Acquiring a package
name
    //acquire PackageInfo mPackageInfo according to the package name;
    mPackageInfo = mContext.getPackageManager( ).getPackageInfo(pkgName, 0);
    if ((mPackageInfo.applicationInfo.flags & ApplicationInfo.FLAG_SYSTEM) <= 0) {
            // Third-party application
        } else {
            // System application
        }
```

An application type of the first receiver may be acquired according to result results of the above codes, and it is judged whether the application type of the first receiver matches a predetermined application type.

In the present technical solution, the predetermined application type is a third-party application, and the predetermined launching state is a non-launched state. The advantages of this arrangement are that the non-launched third-party application may be removed from the receiver queue, which can effectively avoid running burdens on the system caused by direct self-launching of some third-party applications subscribing to more broadcast messages, the response speed of the application program to the broadcast message can be increased, power consumption and system power consumption can be reduced, and resource utilization can be improved.

Figure 2:
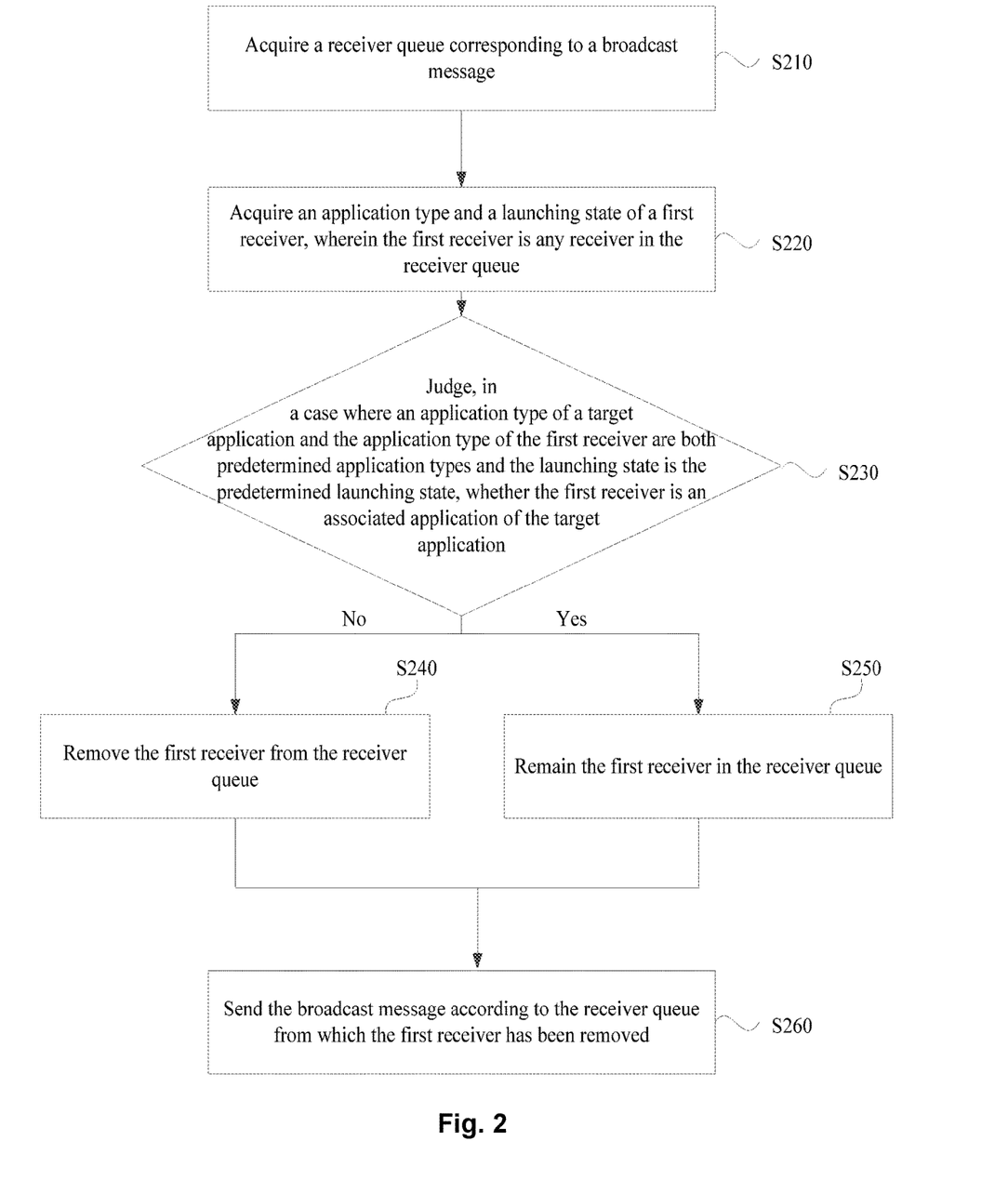
FIG. 2 is a flowchart of a broadcast sending control method according to an embodiment of the present application.

FIG. 2 is a flowchart of a broadcast sending control method according to an embodiment of the present application. As shown in FIG. 2, the broadcast sending control method specifically includes the following operations:

S210: A receiver queue corresponding to a broadcast message is acquired.

S220: An application type and a launching state of a first receiver are acquired, wherein the first receiver is any receiver in the receiver queue.

S230: In a case where an application type of a target application and the application type of the first receiver are both predetermined application types and the launching state is the predetermined launching state, it is judged whether the first receiver is an associated application of the target application. If the first receiver is not an associated application of the target application, S240 is performed, and if the first receiver is an associated application of the target application, S250 is performed.

The target application is a publisher of the broadcast message.

It is determined whether the application type of the publisher of the broadcast message and the application type of the first receiver are predetermined application types, it is judged whether the state of the first receiver is a predetermined launching state, and if the state of the first receiver is a predetermined launching state, it is judged whether the first receiver is the associated application of the publisher of the broadcast message. The associated application may be an application that performs data interaction with the publisher of the broadcast message, for example, there is a data interaction between an image processing tool and a gallery, which may be used as an associated application. The associated application may also be an application with the same function or similar functions, such as a network video playing application, which may be an associated application. In addition, the associated application may be an application program developed by the same company or may be used as an associated application.

If the application type of the publisher of the broadcast message and the application type of the first receiver are both predetermined application types and the launching state is a predetermined launching state, it is judged whether the first receiver is an associated application of the publisher of the broadcast message by acquiring related information of the first receiver and the related information of the publisher of the broadcast message.

S240: The first receiver is removed from the receiver queue.

S250: The first receiver is retained in the receiver queue.

S260: The broadcast message is sent according to the receiver queue from which the first receiver has been removed.

The present technical solution adds the judgment of whether the first receiver is the publisher of the broadcast message based on the foregoing technical solution, and by the arrangement, the phenomenon that the broadcast message cannot be received due to deletion of the association application of the publisher of the broadcast message in the receiver queue can be avoided.

On the basis of the above technical solution, optionally, judging whether the first receiver is the associated application of the target application includes that: in a case where an application signature of the first receiver is the same as an application signature of the target application, it is determined that the first receiver is the associated application of the target application.

The way of checking the application signature can be obtained by acquiring related information of the application program. When an application signature of the first receiver is the same as an application signature of the target application, it is determined that the first receiver is the associated application of the target application. The advantage of the arrangement is that an associated application identification method is provided. According to the foregoing identification method, a first receiver can be quickly and accurately determined to be an associated application of a target application, and then a broadcast message published by the target application is sent to a first application.

On the basis of the above technical solution, optionally, judging whether the first receiver is the associated application of the target application includes that: in a case where the first receiver has a data interaction relationship with the target application, it is determined that the first receiver is the associated application of the target application, wherein the data interaction relationship includes a service using relationship or a database using relationship. The use of a service relationship may be that the first receiver uses internal service (Services) in conjunction with the target application, and the use of a database relationship may be that the first receiver uses the same database, such as a photo library, in conjunction with the target application. By determining that the first receiver has a data interaction relationship with the target application, it can be determined that the two applications are associated applications and a broadcast message is sent to the first receiver. The advantage of this arrangement is that whether the first receiver and the target application are associated applications can be quickly and accurately determined through a data interaction layer.

The embodiments of the present application further provide a broadcast sending control apparatus, which includes a receiver queue acquiring module, an application type and launching state acquiring module, a receiver removing module and a broadcast message sending module.

The receiver queue acquiring module is configured to acquire a receiver queue corresponding to a broadcast message.

The application type and launching state acquiring module is configured to acquire an application type and a launching state of a first receiver, wherein the first receiver is any receiver in the receiver queue.

The receiver removing module is configured to remove, in a case where the application type is a predetermined application type and the launching state is a predetermined launching state, the first receiver from the receiver queue.

The broadcast message sending module is configured to send, according to the receiver queue from which the first receiver has been removed, the broadcast message.

In some embodiments, the receiver removing module includes an associated application judging unit and a first receiver retaining unit.

The associated application judging unit is configured to judge, in a case where an application type of a target application and the application type of the first receiver are both predetermined application types and the launching state is the predetermined launching state, whether the first receiver is an associated application of the target application, wherein the target application is a publisher of the broadcast message.

The first receiver retaining unit is configured to retain, in response to the judgment that the first receiver is the associated application, the first receiver in the receiver queue.

In some embodiments, the associated application judging unit includes a first associated application judging sub-unit.

The first associated application judging sub-unit is configured to determine, in a case where an application signature of the first receiver is the same as an application signature of the target application, that the first receiver is the associated application of the target application.

In some embodiments, the associated application judging unit includes a second associated application judging sub-unit.

The second associated application judging sub-unit is configured to determine, in a case where the first receiver has a data interaction relationship with the target application, that the first receiver is the associated application of the target application, wherein the data interaction relationship includes a service using relationship or a database using relationship.

In some embodiments, the predetermined application type is a third-party application, and the predetermined launching state is a non-launched state.

In some embodiments, the broadcast message sending module is configured to:

acquire a broadcast message blacklist;

remove receivers in the broadcast message blacklist from the receiver queue from which the first receiver has been removed to obtain a receiver-removed queue; and send the broadcast message according to the receiver-removed queue.

In some embodiments, the receiver queue acquiring module is configured to:

acquire one or more application programs that subscribe to the broadcast message; and generate a corresponding receiver queue according to the one or more acquired application programs.

Figure 3:
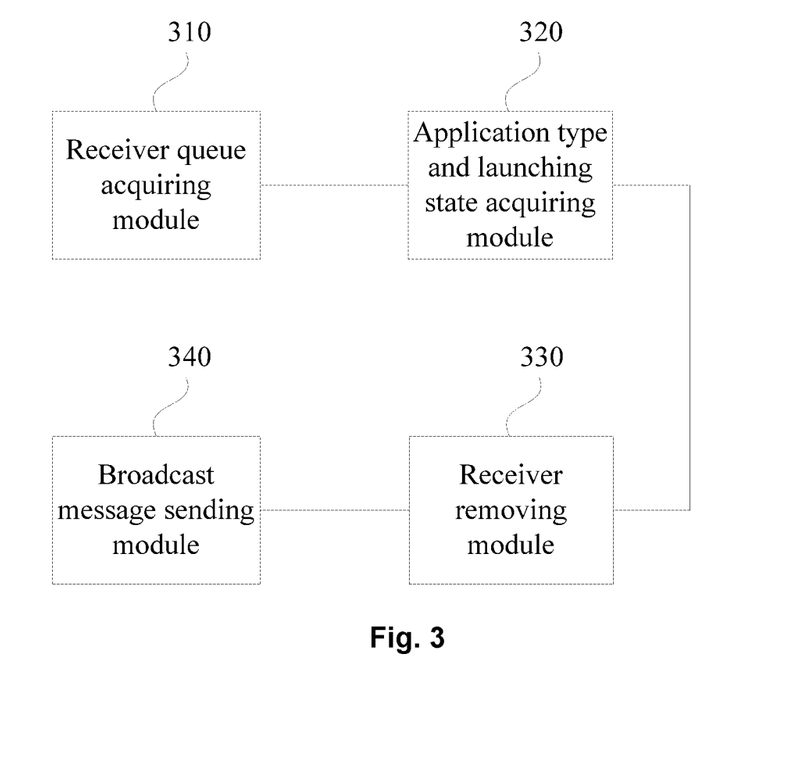
FIG. 3 is a structural diagram of a broadcast sending control apparatus according to an embodiment of the present application.

FIG. 3 is a structural diagram of a broadcast sending control apparatus according to an embodiment of the present application. The apparatus may be configured in a mobile terminal. As shown in FIG. 3, the broadcast sending control apparatus includes a receiver queue acquiring module 310, an application type and launching state acquiring module 320, a receiver removing module 330 and a broadcast message sending module 340.

The receiver queue acquiring module 310 is configured to acquire a receiver queue corresponding to a broadcast message.

The application type and launching state acquiring module 320 is configured to acquire an application type and a launching state of a first receiver, wherein the first receiver is any receiver in the receiver queue.

The receiver removing module 330 is configured to remove, in a case where the application type is a predetermined application type and the launching state is a predetermined launching state, the first receiver from the receiver queue.

The broadcast message sending module 340 is configured to send, according to the receiver queue from which the first receiver has been removed, the broadcast message.

In the present technical solution, the predetermined application type is a third-party application, and the predetermined launching state is a non-launched state. The advantages of this arrangement are that the non-launched third-party application may be removed from the receiver queue, which can effectively avoid running burdens on the system caused by direct self-launching of some third-party applications subscribing to more broadcast messages, the response speed of the application program to the broadcast message can be increased, power consumption and system power consumption can be reduced, and resource utilization can be improved.

On the basis of the above technical solution, the receiver removing module 330 includes an associated application judging unit and a first receiver retaining unit.

The associated application judging unit is configured to judge, in a case where an application type of a target application and the application type of the first receiver are both predetermined application types and the launching state is the predetermined launching state, whether the first receiver is an associated application of the target application, wherein the target application is a publisher of the broadcast message.

The first receiver retaining unit is configured to retain, in response to the judgment that the first receiver is the associated application, the first receiver in the receiver queue.

On the basis of the above technical solution, the associated application judging unit includes: a first associated application judging sub-unit, configured to determine, in a case where an application signature of the first receiver is the same as an application signature of the target application, that the first receiver is the associated application of the target application.

On the basis of the above technical solution, the associated application judging unit includes a second associated application judging sub-unit.

The second associated application judging sub-unit is configured to determine, in a case where the first receiver has a data interaction relationship with the target application, that the first receiver is the associated application of the target application, wherein the data interaction relationship includes a service using relationship or a database using relationship.

On the basis of the above technical solution, the predetermined application type is a third-party application, and the predetermined launching state is a non-launched state.

The above products may perform any method provided by the embodiments of the present application, and have the corresponding functional modules and beneficial effects for performing the method.

Figure 4:
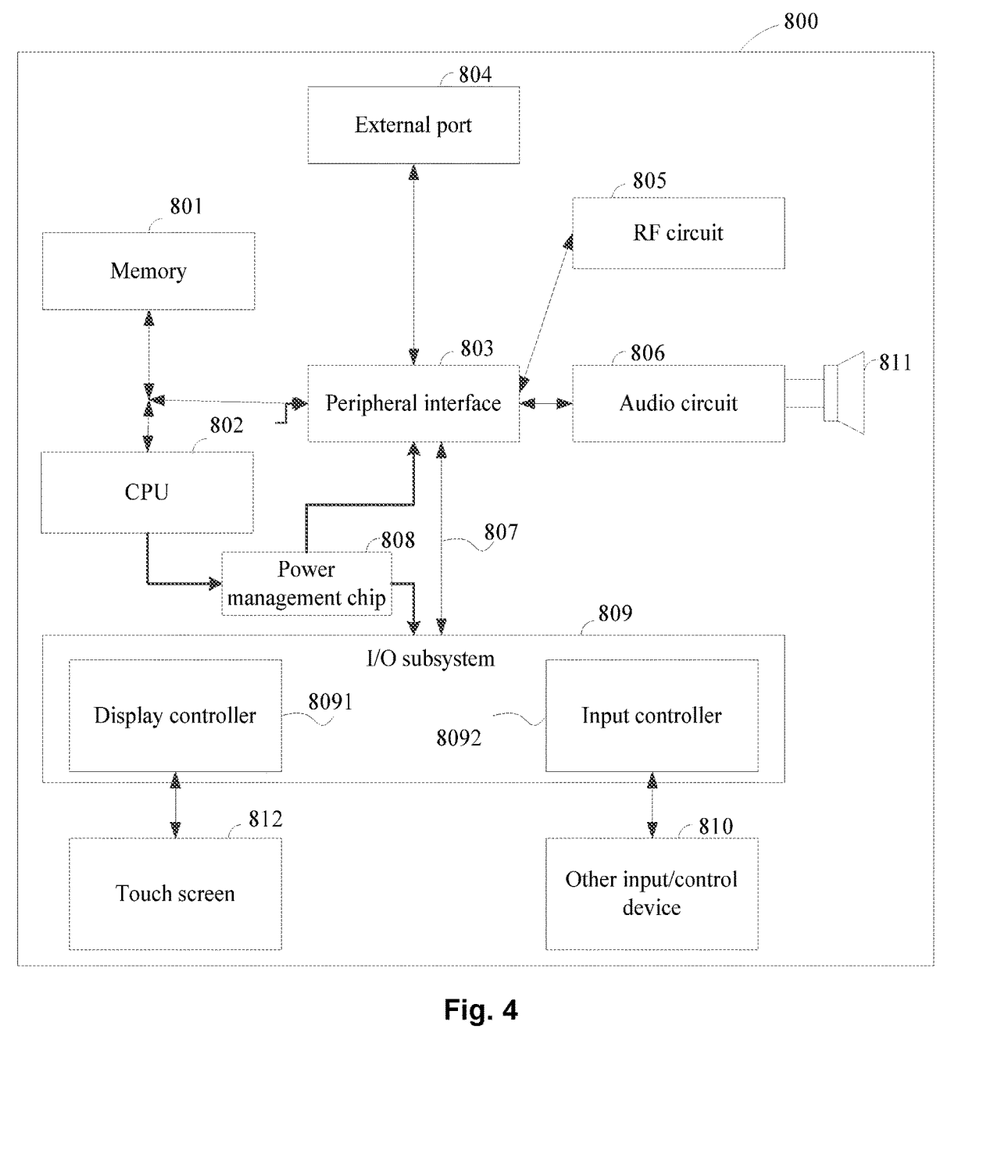
FIG. 4 is a structural diagram of a mobile terminal according to an embodiment of the present application.

The embodiments of the present application also provide an electronic device. The electronic device may be a smart phone, a tablet computer or other mobile terminals. FIG. 4 is a structural diagram of a mobile terminal according to an embodiment of the present application. As shown in FIG. 4, the mobile terminal 800 may include: a housing (not shown), a memory 801, a Central Processing Unit (CPU) 802 (also called as a processor), a computer program that is stored on the memory 801 and is runnable on the processor 802, a circuit board (not shown), and a power circuit (not shown). The circuit board is disposed inside a space defined by the housing. The CPU 802 and the memory 801 are disposed on the circuit board. The power circuit is configured to supply power to various circuits or devices of the mobile terminal. The memory 801 is configured to store executable program codes. The CPU 802 runs programs corresponding to the executable program codes by reading the executable program codes stored in the memory 801 to perform the following operations:

a receiver queue corresponding to a broadcast message is acquired;

an application type and a launching state of a first receiver are acquired, wherein the first receiver is any receiver in the receiver queue;

in a case where the application type is a predetermined application type and the launching state is a predetermined launching state, the first receiver is removed from the receiver queue; and the broadcast message is sent according to the receiver queue from which the first receiver has been removed.

The mobile terminal 800 further includes: a peripheral interface 803, a Radio Frequency (RF) circuit 805, an audio circuit 806, a speaker 811, a power management chip 808, an Input/Output (I/O) subsystem 809, a touch screen 812, another input/control device 810 and an external port 804, and these components communicate through one or more communication buses or signal wires 807.

It is to be understood that the mobile terminal 800 shown in the figure is only an example of the mobile terminal, the mobile terminal 800 may have more or fewer components than those shown in the figure, two or more components may be combined or different component configurations may be made. Each component shown in the figure may be implemented in hardware including one or more signal processing and/or application specific integrated circuits, software or a combination of the hardware and the software.

A mobile terminal provided by the present embodiment for implementing a function of controlling broadcast sending will be described below in detail. For example, the mobile terminal is a mobile phone.

The memory 801: the memory 801 may be accessed by the CPU 802, the peripheral interface 803 and the like, and the memory 801 may include a high-speed Random Access Memory (RAM) and may further include a nonvolatile memory, for example, one or more disk storage devices, flash memories or other nonvolatile solid-stage storage devices.

The peripheral interface 803: the peripheral interface 803 may connect I/O peripherals of the device to the CPU 802 and the memory 801.

The I/O subsystem 809: the I/O subsystem 809 may connect the I/O peripherals of the device, for example, the touch screen 812 and the other input/control device 810 to the peripheral interface 803. The I/O subsystem 809 may include a display controller 8091 and one or more input controllers 8092 configured to control the other input/control device 810. Herein, the one or more input controllers 8092 receive electric signals from the other input/control device 810 or send electric signals to the other input/control device 810, and the other input/control device 810 may include a physical button (a pressing button and a rocker arm button), a dial, a slide switch, a joystick and a click roller. It is to be noted that the input controller 8092 may be connected with any one of a keyboard, an infrared port, a Universal Serial Bus (USB) interface and an indication device such as a mouse.

According to the working principle of a touch screen and a medium for transmitting information, the touch screen 812 may be a resistive, capacitive inductive, infrared or surface acoustic wave type. According to the installation manner, the touch screen 812 may be external, built-in or integrated. According to the technical principle, the touch screen 812 may be: a vector pressure sensing technology touch screen, a resistive technology touch screen, a capacitive technology touch screen, an infrared technology touch screen or a surface acoustic wave technology touch screen.

The touch screen 812: the touch screen 812 is an input interface and output interface between the user terminal and the user and displays visual output to the user, and the visual output may include a graph, a text, an icon, a video and the like. Optionally, the touch screen 812 sends an electrical signal (such as an electrical signal of a contact surface) triggered by a user on the touch screen to the processor 802.

The display controller 8091 in the I/O subsystem 809 receives an electric signal from the touch screen 812 or sends an electric signal to the touch screen 812. The touch screen 812 detects a contact on the touch screen, the display controller 8091 converts the detected contact into interaction with a user interface object displayed on the touch screen 812 to implement human-computer interaction, and the user interface object displayed on the touch screen 812 may be an icon of a running game, an icon of connection to a corresponding network and the like. It is to be noted that the device may further include an optical mouse, and the optical mouse is a touch-sensitive surface which does not display visual output or an extension of a touch-sensitive surface formed by the touch screen.

The RF circuit 805 is mainly configured to establish communication between the mobile phone and a wireless network (i.e., a network side) to implement data receiving and sending between the mobile phone and the wireless network, for example, receiving and sending of a short message and an electronic mail.

The audio circuit 806 is mainly configured to receive audio data from the peripheral interface 803, convert the audio data into an electric signal and send the electric signal to the speaker 811.

The speaker 811 is configured to restore a voice signal received from the wireless network by the mobile phone through the RF circuit 805 into a sound and play the sound to the user.

The power management chip 808 is configured to perform power supply and power management on the CPU 802, the I/O subsystem and hardware connected with the peripheral interface.

In the present embodiment, the CPU 802 is configured to:

acquire a receiver queue corresponding to a broadcast message;

acquire an application type and a launching state of a first receiver, wherein the first receiver is any receiver in the receiver queue;

remove, in a case where the application type is a predetermined application type and the launching state is a predetermined launching state, the first receiver from the receiver queue; and send, according to the receiver queue from which the first receiver has been removed, the broadcast message.

In some embodiments, for the operation of removing the first receiver from the receiver queue in a case where the application type is the predetermined application type and the launching state is the predetermined launching state, the computer program is executed by the processor 802 to implement the following operations:

in a case where an application type of a target application and the application type of the first receiver are both predetermined application types and the launching state is the predetermined launching state, it is judged whether the first receiver is an associated application of the target application, wherein the target application is a publisher of the broadcast message; and in response to the judgment that the first receiver is the associated application, the first receiver is retained in the receiver queue.

In some embodiments, for the operation of judging whether the first receiver is the associated application of the target application, the computer program is executed by the processor 802 to implement the following operations:

in a case where an application signature of the first receiver is the same as an application signature of the target application, it is determined that the first receiver is the associated application of the target application.

In some embodiments, for the operation of judging whether the first receiver is the associated application of the target application, the computer program is executed by the processor 802 to implement the following operations:

in a case where the first receiver has a data interaction relationship with the target application, it is determined that the first receiver is the associated application of the target application, wherein the data interaction relationship includes a service using relationship or a database using relationship.

In some embodiments, the predetermined application type is a third-party application, and the predetermined launching state is a non-launched state.

In some embodiments, for the operation of sending the broadcast message according to the receiver queue from which the first receiver has been removed, the computer program is executed by the processor 802 to implement the following operations:

a broadcast message blacklist is acquired;

receivers in the broadcast message blacklist are removed from the receiver queue from which the first receiver has been removed to obtain a receiver-removed queue; and the broadcast message is sent according to the receiver-removed queue.

In some embodiments, for the operation of acquiring a receiver queue corresponding to a broadcast message, the computer program is executed by the processor 802 to implement the following operations:

one or more application programs that subscribe to the broadcast message are acquired; and a corresponding receiver queue is generated according to the one or more acquired application programs.

It is to be noted that the mobile terminal 800 may further include a camera, a Bluetooth module, and the like, and details are not described herein.

The embodiment of the present application also provides a storage medium, having multiple instructions stored therein. The instructions may be adapted to be loaded by a processor to perform any of the above broadcast sending control method.

It will be understood by those of ordinary skill in the art that all or part of the operations of the various methods in the above embodiments may be completed by instructing related hardware through programs, which may be stored in a computer-readable storage medium. The storage medium may include: a Read Only Memory (ROM), a RAM, a magnetic disk or an optical disk.

It is noted that the above are only the preferred embodiments of the present application and the technical principles applied thereto. Those skilled in the art will appreciate that the present application is not limited to the specific embodiments described herein, and various obvious changes, re-adjustments and substitutions may be made by those skilled in the art without departing from the scope of protection of the present application. Therefore, the present application has been described in detail by the above embodiments, but the present application is not limited to the above embodiments, and more other equivalent embodiments may be included without departing from the concept of the present application. The scope of the present application is determined by the scope of the appended claims.

What is claimed is:

1. A broadcast sending control method, comprising:
   acquiring a receiver queue corresponding to a broadcast message;
   acquiring an application type and a launching state of a first receiver;
   removing the first receiver from the receiver queue in response to the application type being a predetermined application type and the launching state being a predetermined launching state; and
   sending the broadcast message according to the receiver queue from which the first receiver has been remove.

2. The broadcast sending control method as claimed in claim 1, wherein removing the first receiver from the receiver queue in response to the application type being a predetermined application type and the launching state being a predetermined launching state comprises:
   identifying whether the first receiver is an associated application of the target application in response to the application type of a target application and the application type of the first receiver being both predetermined application types and the launching state being the predetermined launching state, wherein the target application is a publisher of the broadcast message; and
   retaining the first receiver in the receiver queue in response to the first receiver being the associated application.

3. The broadcast sending control method as claimed in claim 2, wherein identifying whether the first receiver is the associated application of the target application comprises:
   identifying the first receiver to the associated application of the target application in response to an application signature of the first receiver is the same as an application signature of the target application.

4. The broadcast sending control method as claimed in claim 2, wherein identifying whether the first receiver is the associated application of the target application comprises:
   Identifying the first receiver to the associated application of the target application in response to the first receiver having a data interaction relationship with the target application, wherein the data interaction relationship comprises a service using relationship or a database using relationship.

5. The broadcast sending control method as claimed in claim 2, wherein sending, according to the receiver queue from which the first receiver has been removed, the broadcast message comprises:
   acquiring a broadcast message blacklist;
   removing receivers in the broadcast message blacklist from the receiver queue from which the first receiver has been removed to obtain a receiver-removed queue; and
   sending the broadcast message according to the receiver-removed queue.

6. The broadcast sending control method as claimed in claim 1, wherein the predetermined application type is a third-party application, and the predetermined launching state is a non-launched state.

7. The broadcast sending control method as claimed in claim 1, wherein sending the broadcast message according to the receiver queue from which the first receiver has been removed comprises:

acquiring a broadcast message blacklist;
removing receivers in the broadcast message blacklist from the receiver queue from which the first receiver has been removed to obtain a receiver-removed queue; and
sending the broadcast message according to the receiver-removed queue.

8. The broadcast sending control method as claimed in claim 1, wherein acquiring the receiver queue corresponding to the broadcast message comprises:
acquiring one or more application programs that subscribe to the broadcast message; and
generating the receiver queue corresponding to the broadcast message according to the one or more acquired application programs.

9. The broadcast sending control method as claimed in claim 8, wherein sending, according to the receiver queue from which the first receiver has been removed, the broadcast message comprises:
acquiring a broadcast message blacklist;
removing receivers in the broadcast message blacklist from the receiver queue from which the first receiver has been removed to obtain a receiver-removed queue; and
sending the broadcast message according to the receiver-removed queue.

10. The broadcast sending control method as claimed in claim 1, further comprising:
setting a system broadcast launching list, wherein receivers in the system broadcast launching list are allowed to be self-launched after receiving a system broadcast.

11. A storage medium, having a plurality of instructions stored therein, the instructions being adapted to be loaded by a processor to perform operations of:
acquiring a receiver queue corresponding to a broadcast message;
acquiring an application type and a launching state of a first receiver;
removing the first receiver from the receiver queue in response to the application type being a predetermined application type and the launching state being a predetermined launching state; and
sending the broadcast message according to the receiver queue from which the first receiver has been removed.

12. An electronic device, comprising: a memory, a processor and a computer program that is stored on the memory and runnable on the processor, wherein the computer program is executed by the processor to implement the following operations:
acquiring a receiver queue corresponding to a broadcast message;
acquiring an application type and a launching state of a first receiver;
removing the first receiver from the receiver queue in response to the application type being a predetermined application type and the launching state being a predetermined launching state; and
sending the broadcast message according to the receiver queue from which the first receiver has been removed.

13. The electronic device as claimed in claim 12, wherein the computer program is executed by the processor to implement the following operations:
identifying whether the first receiver is an associated application of the target application in response to the application type of a target application and the application type of the first receiver being both predetermined application types and the launching state being the predetermined launching state, wherein the target application is a publisher of the broadcast message; and
retaining the first receiver in the receiver queue; in response to the first receiver being the associated application.

14. The electronic device as claimed in claim 13, wherein the computer program is executed by the processor to implement the following operations:
determining, in a case where an application signature of the first receiver is the same as an application signature of the target application, that the first receiver is the associated application of the target application.

15. The electronic device as claimed in claim 13, wherein the computer program is executed by the processor to implement the following operations:
Identifying the first receiver to the associated application of the target application in response to the first receiver having a data interaction relationship with the target application wherein the data interaction relationship comprises a service using relationship or a database using relationship.

16. The electronic device as claimed in claim 13, wherein the computer program is executed by the processor to implement the following operations:
acquiring a broadcast message blacklist;
removing receivers in the broadcast message blacklist from the receiver queue from which the first receiver has been removed to obtain a receiver-removed queue; and
sending the broadcast message according to the receiver-removed queue.

17. The electronic device as claimed in claim 12, wherein the predetermined application type is a third-party application, and the predetermined launching state is a non-launched state.

18. The electronic device as claimed in claim 12, wherein the computer program is executed by the processor to implement the following operations:
acquiring a broadcast message blacklist;
removing receivers in the broadcast message blacklist from the receiver queue from which the first receiver has been removed to obtain a receiver-removed queue; and
sending the broadcast message according to the receiver-removed queue.

19. The electronic device as claimed in claim 12, wherein the computer program is executed by the processor to implement the following operation:
setting a system broadcast launching list, wherein receivers in the system broadcast launching list are allowed to be self-launched after receiving a system broadcast.

20. The electronic device as claimed in claim 12, wherein the computer program is executed by the processor to implement the following operations:
acquiring one or more application programs that subscribe to the broadcast message; and
generating the receiver queue corresponding to the broadcast message according to the one or more acquired application programs.

\* \* \* \* \*